T. MILLER.
POTATO PARER.
APPLICATION FILED SEPT. 10, 1913.
1,104,212.
Patented July 21, 1914.
2 SHEETS—SHEET 1.
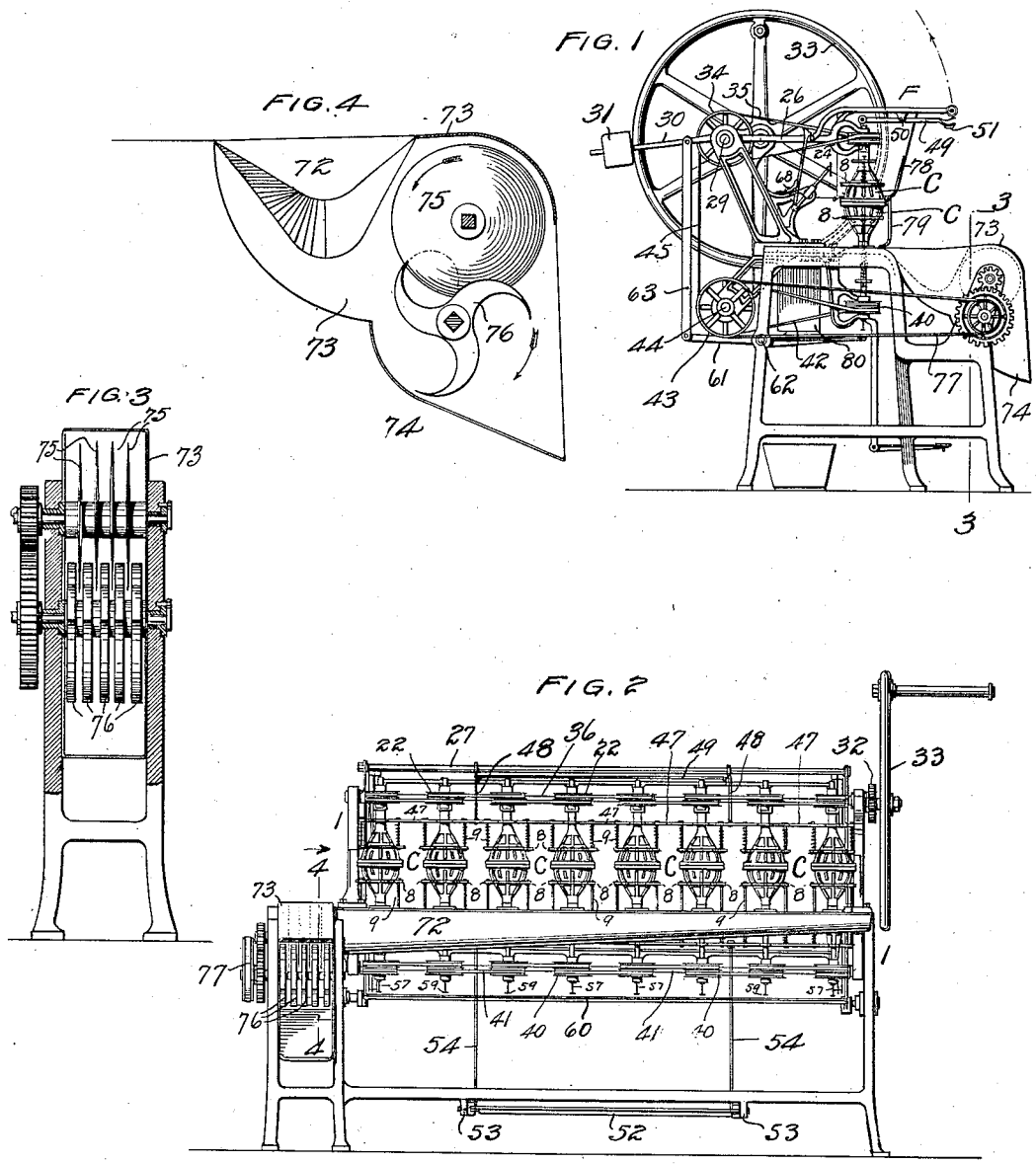

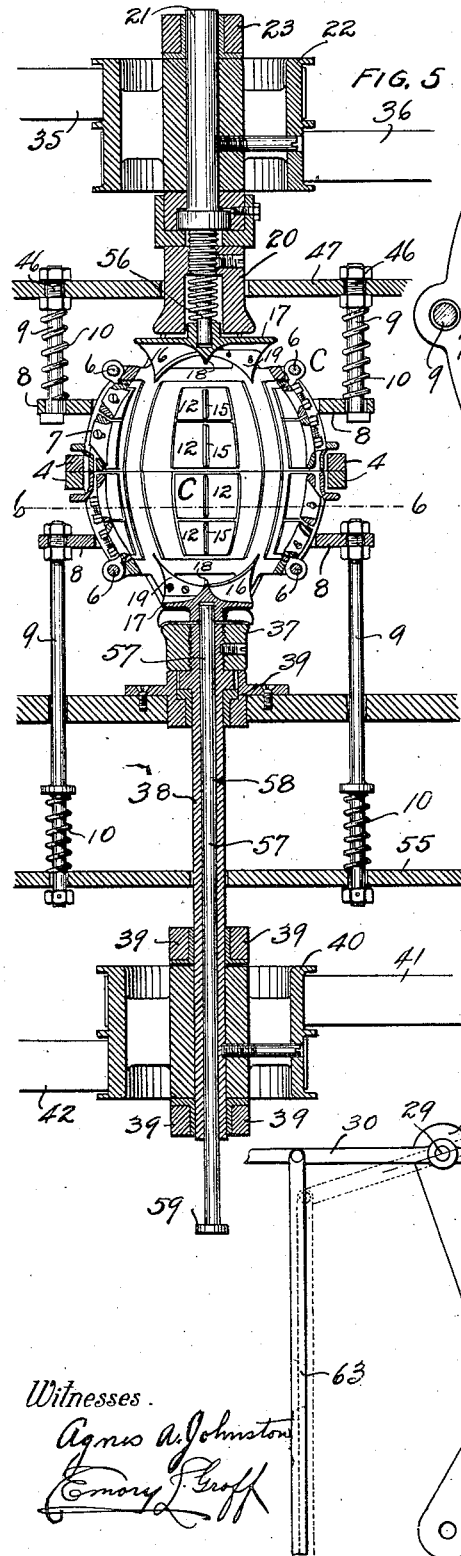
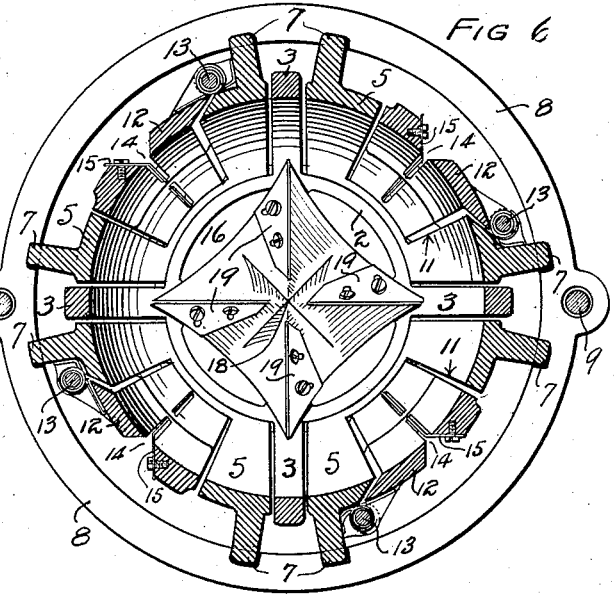
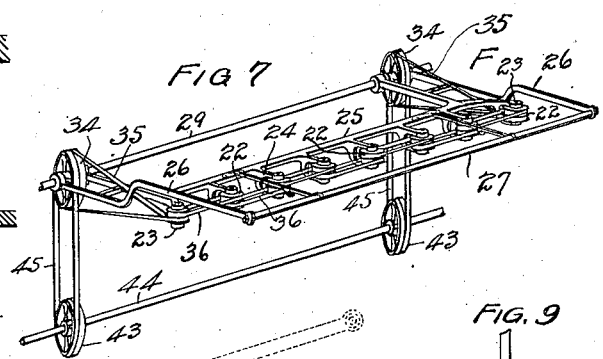
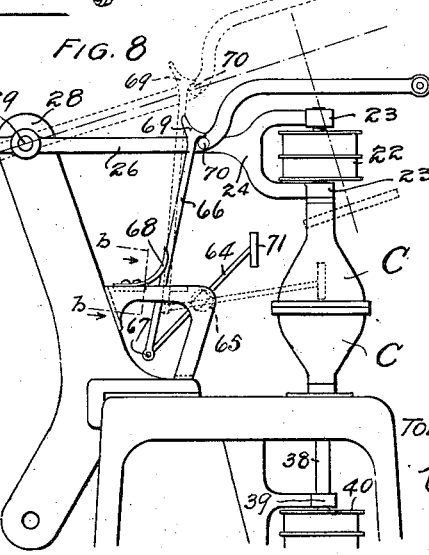
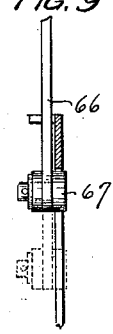

UNITED STATES PATENT OFFICE.

TOBIAS MILLER, OF YOUNGSTOWN, OHIO.

POTATO-PARER.

1,104,212.   Specification of Letters Patent.   Patented July 21, 1914.

Application filed September 10, 1913. Serial No. 789,108.

*To all whom it may concern:*

Be it known that I, TOBIAS MILLER, a citizen of the United States, residing at Youngstown, in the county of Mahoning and State of Ohio, have invented certain new and useful Improvements in Potato-Parers, of which the following is a specification.

This invention relates to the subject of appliances for preparing fruits and vegetables for use, and has special reference to a novel and practical construction of machine possessing special utility as a potato parer. To this end, the invention contemplates a paring machine, (particularly designed for paring or peeling potatoes), so constructed that the same may be conveniently operated for thoroughly paring the vegetable or fruit in quantities, while at the same time embodying means for effecting the paring, or peeling of the skin without undue waste.

Another object of the invention is to provide a paring machine wherein means are provided for automatically adapting the cutters to different sizes of the vegetable or fruit without impairing the shaving or peeling operation, and also to provide novel and reliable means for ejecting all of the pared objects by the simple act of opening-up the paring units. Also the invention has in view a novel combination of elements which includes means for slicing or cutting up into small pieces the pared objects as they are discharged from the paring units.

With these and other objects in view which will be readily apparent from the general nature of the machine, the invention consists in the novel construction, combination, and arrangement of parts hereinafter more fully described, illustrated, and combined.

Though susceptible of various structural modifications in non-essential particulars, a preferred and practical embodiment of the invention is shown in the accompanying drawings, in which—

Figure 1 is an end view of a multiple paring machine constructed in accordance with the present invention. Fig. 2 is a side elevation thereof. Fig. 3 is an enlarged sectional view of the slicing mechanism arranged at the delivery end of the discharge chute of the machine; the line of section being indicated by the line 3—3 on Fig. 1 of the drawings. Fig. 4 is an enlarged detail sectional view on the line 4—4 of Fig. 2 illustrating more plainly the internal construction of the slicing mechanism. Fig. 5 is an enlarged vertical sectional view of one of the complete paring units including the driving means, and also the clamping means for each cup member thereof. Fig. 6 is an enlarged cross sectional view through one of the cup members on the section line 6—6 of Fig. 5. Fig. 7 is a skeleton or fragmentary perspective view illustrating the means for mounting and driving what may be termed the upper cup members of the paring unit. Fig. 8 is a diagrammatic view illustrative of the movements of the vertically swinging top carrying-frame for the upper cup members, and of the discharging device for automatically removing the potatoes or pared fruit from the machine. Fig. 9 is a detail sectional view on the line b—b of Fig. 8, showing more clearly a detail of the discharging device which is operated by the movement of the carrying-frame for the upper cup members.

Like reference characters designate corresponding parts in the several figures of the drawings.

The working parts of the novel paring machine are carried by a suitable framework, designated by the numeral 1 and constituting the machine stand. This stand or frame-work provides the primary support for a gang or series of paring units. Any number of these paring units may be employed according to the desired capacity of the machine. They are of duplicate construction and are operated simultaneously whereby a number of potatoes or other objects may be pared at the same time, thus providing means whereby hand-paring or peeling may be entirely dispensed with and this work accomplished quickly, accurately, and in quantities.

Each of the paring units primarily consists of a pair of approximately semiglobular cup members designated generally by the letter C. These two cup members, of each unit, are arranged in registering superposed relation and are adapted to hold and confine therein a single potato, and inasmuch as each of said cup members carries knife blades, it will be understood that each cup member has a holding or clamping function for the potato, as well as a cutting function to pare the skin from the body thereof.

Referring more in detail to the structural characteristics of each cup member, of each paring unit, it will be observed by reference to Figs. 5 and 6 of the drawings, that said member includes in its organization a skeleton body frame of spider formation having a central head member 2 and a plurality of curving frame arms 3 radiating and projecting from one side of the head member and united with an edge ring 4 which registers with the corresponding ring of the other cup member of the unit, so that the unit is entirely closed about the potato when the two cup members are brought together. Between each pair of the frame arms of the cup member is hung a clamp segment 5. This segment conforms to the general curvature of the cup member frame and has a pivotal mounting at its upper end by means of a hinge connection 6 between such end and the said frame, while the unhinged end of the clamp segment is confined for a limited play within the edge ring 4, as best shown in Fig. 5 of the drawings. It will thus be seen that the several clamp segments 5 of each cup member C are capable of a limited movement toward and from the longitudinal axis of the paring unit, and are provided upon their external sides with the exterior longitudinally disposed bearing ribs 7 which are adapted to be slidably engaged by a clamping ring 8 which is yieldingly carried by bracket rods 9, which also support pressure springs 10 that provide the yieldable mounting for the ring 8.

Each movable clamp segment of each cup member C has formed therein a longitudinally disposed opening 11 in which is yieldingly held a laterally swinging knife block 12 having a spring hinge connection 13 at one of its edges to the segment carrying the same, said spring hinge connection consisting of the usual hinge elements and a spring coiled about the hinge pintle and exerting a tension in a direction to normally hold the knife block within its opening 11, while at the same time permitting outward yielding thereof to adapt it to the size of potato being operated upon. The knife block 12 for each clamp segment may be in sections, (as shown in Figs. 5 and 6 of the drawings) with each section of the knife block having a knife opening 14 in which is arranged a knife blade 15 whose cutting edge projects at the inner side of the knife block for engagement with the potato to be pared.

In addition to the features of construction referred to, in connection with the mounting of the various knife blades about the body or frame of each cup member, the latter also has associated therewith an end cutter head 16 mounted within the bottom portion of the cup member. This end cutter head is provided with projecting arms 17 which interlock with the skeleton body frame of the cup member so as to compel the end cutter to rotate therewith, and the body of said end cutter is formed with a central centering and holding point 18 for the potato and with a plurality of radially extending inclined seats for radially arranged terminal knife blades 19 whose edges are all disposed in the same direction and provide means for paring off the skin of the potato at the end thereof.

Referring to the individual mounting of each of the upper cup members C, it will be observed from Fig. 5 of the drawings that the body frame thereof is formed with a terminal collar element 20 which has a rigid connection with a driving spindle 21 carrying a double grooved belt pulley 22 and journaled in the bearings 23 of a bearing fork 24, which in turn is carried by one of the frame bars 25 of a vertically swinging top carrying frame F for the upper cup members. The supporting frame bar 25 is provided with a series of bearing forks 24 corresponding to the number of paring units in the machine, and is rigidly joined to the end bars 26 of the frame F, which essentially comprises the said end bars and a front operator's handle 27 connecting them. The said end bars 26 have a pivotal support intermediate their ends, as at 28, on a shaft 29 and beyond one side of this shaft the said end bars are provided with arm extensions 30 carrying counterbalancing weights 31. The said shaft 29 is geared or otherwise operatively connected as at 32 with the hand wheel 33 or equivalent source of power and has fitted thereon belt wheels 34 having belt connections 35 with the terminal pulleys 22 of the series of such pulleys. Short belt connections 36 from one pulley 22 to an adjacent pulley 22, provide, in connection with the belts 35, means for simultaneously rotating the entire series of belt pulleys 22, and hence the upper cup members C of all of the paring units when motion is communicated to the main drive shaft 29 from the hand wheel 33 or other source of power. Similarly, the body frame of each lower cup member C is formed with a terminal collar element 37 having a rigid connection with a driving spindle 38 journaled in suitable alined bearings 39 and carrying a double grooved belt pulley 40 having short belt connections 41 with adjacent pulleys of the series of such pulleys for the lower cup members. The terminal pulleys of this series have belt connections 42 with belt wheels 43 on a countershaft 44, which, in turn, has a belted connection 45 with the main driving shaft 29, thus providing means whereby the upper and lower cup members of all the paring units may simultaneously be driven from the same source.

To provide for simultaneously controlling the clamping rings 8 for the upper cup members of all the paring units, the bracket rods 9 carrying the said rings are suitably fastened, as at 46, to a universal connecting bar 47 having link or equivalent connections 48 with a controlling lever frame 49 pivotally hung from the top carrying frame F as at 50, and having a handle member 51 conveniently disposed beneath the operator's handle 27, so that the operator can grasp both handles at once and by merely tightening the grip can move the lever frame 49 so as to provide for depressing the universal bars 47 and thereby move the rings 8 for all of the upper cup members into clamping engagement with the clamp segments 5. The effect of this is to cause the upper cup members to act as clamps for gripping the potatoes and holding the upper halves thereof while the lower halves are being pared or peeled by the lower cup members. Vice versa, when the upper cup members are free of the clamping action of their rings 8, the lower cup members are caused to act as holding or clamping means for the lower halves of the potatoes by moving the clamping rings 8 therefor into active positions through suitable controlling connections which include an operator's treadle 52 pivotally hung within the base of the machine stand at 53 and having rod connections 54 with a universal connecting bar 55 which connects with all of the bracket rods 9 for the said lower series of the clamping rings 8.

The end cutter head 16 within the bottom portion of each upper cup member has a yielding spring support as at 56 within the terminal collar element 20, thus permitting the distance between the opposite cutter heads 16 of each paring unit to adjust itself to the size of the potato. The lower end cutter head 16 of each paring unit is fitted to the upper end of an ejector rod 57 slidably mounted within the longitudinal bore 58 of the driving spindle 38 for the lower cup member. The lower end of each ejector rod 57 may be formed with a head 59 adapted to be engaged by a common lifting bar 60 carried by lever members 61 pivotally hung in the machine stand as at 62, and having bar connections 63 between their rear ends and the rear arm extensions 30 of the end bars 26 of the frame F. By reason of this construction and arrangement of parts, it will be observed that when the top carrying frame F is lifted, thereby raising all of the upper cup members, the bar connections 63 will be depressed, with the result of lifting the bar 60 so that the end cutter head 16 in the lower cup member of each paring unit will act as an ejector to lift the pared potato into the opening provided between the two cup members through the lifting up of the upper cup members, at which opening the pared potato will be exposed to the impact of the kicker bar 64 of the discharging device. The said discharging device includes a series of the kicker bars 64, one for each paring unit, and a rocker shaft 65 journaled on the machine stand and having openings through which the kicker bars slide when swung on the axis provided by the rocker shaft through the action of a trip lever 66 having a pivotal connection, as at 67, with the connected series of kicker bars. The trip lever 66 is normally pressed toward the rocker shaft 65 under the influence of a spring 68 bearing thereagainst, and at its upper end the trip lever 66 is provided with a catch hook 69 normally engaged by a lifting pin 70 carried by the top frame F. When the top frame F is lifted, as shown by dotted lines in Fig. 8 of the drawings, the hook and pin connection 69 and 70 cause the trip lever 66 to be raised and swung backward with the spring 68 acting as its fulcrum thus causing not only the rocking of the kicker bars 64 on their axes, but also causing the same to slide forward in a path across the upper cup members, so that the impact heads 71 of the kicker bars will displace the pared potato and kick the same into the delivery chute 72 arranged lengthwise of the machine at the front side thereof. As the kicker bars perform the functions stated, the top carrying frame will have reached a position where the catch hook 69 will automatically disengage itself from the pin 70, thus permitting the spring 68 to automatically retract and fold the elements of the discharging device into their normal full line positions shown in Fig. 8 of the drawings.

The delivery chute 72 directs the pared potatoes into the casing 73 of a slicing machine 74 which includes in its organization a plurality of rotary circular cutters 75 and a plurality of rotary plural-pronged feeding hooks 76 alternating with the cutters 75 and serving to forcibly carry the potatoes between and past the cutters. This mechanism which may be conveniently belted by means of the belt connection 77 with the countershaft 44 serves to cut up or slice the pared potato into small pieces.

During the paring operation of the potato by the cup members, the parings are prevented from working out to the front into the chute 72 by means of the shield plates or guards 78 and 79 which are respectively arranged in front of the entire series of upper and lower cup members, the upper shield 78 being preferably carried by the top frame F as shown in Fig. 1 so as not to obstruct the discharge of the potato by the discharging device. The parings may be conveniently deflected into a parings box 80 arranged within the machine stand in the rear of the paring unit.

From the foregoing, it is thought that the construction, operation, and many advantages of the hereindescribed paring machine will be apparent without further description, and it will be understood that changes in the form, proportion, and minor details of construction may be resorted to without departing from the principle or sacrificing any of the advantages of the invention. Also, it will be understood that the application of the invention is not limited to the paring of potatoes, but is equally available, as stated, for paring apples or other objects.

I claim:

1. A paring machine including a paring unit consisting of a pair of cup members each having holding and cutting means, means for rotating the cup members, means for separating the cup members, and means for discharging the pared object when the cup members are separated.

2. A paring machine including a paring unit consisting of a pair of cup members each having cutting means, means for rotating the cup members, means for separating the cup members, a manually operated ejector arranged in one of the cup members, and a discharging device operating between the cup members when separated.

3. A paring machine including a paring unit consisting of a pair of cup members, each of which comprises a body frame and a plurality of yieldingly mounted knife-carrying members, and means for rotating said members.

4. A paring machine including a paring unit consisting of a pair of cup members, each of which comprises a body frame, a plurality of movable segments hung within said frame, and a plurality of knife-carrying blocks movably mounted in said segments, manually controlled clamping means coöperating with said movable segments, and means for rotating the cup members.

5. A paring machine including a paring unit consisting of a pair of cup members each of which comprises a body frame, a plurality of movable segments pivotally hung within the frame, and a plurality of knife-carrying blocks mounted in the segments and having spring hinge connections therewith, manually controlled clamping means coöperating with said movable segments, and means for rotating the cup members.

6. A paring machine including a paring unit consisting of a pair of cup-members each of which comprises a skeleton body frame, a plurality of movable segments pivotally hung at one end within the frame, and a knife-carrying block mounted in each segment and having a spring hinge connection therewith, the pivot axis of each knife-carrying block being disposed at substantially right angles to the pivot axis of the segment in which it is mounted, and means for rotating the cup members.

7. A paring machine including a paring unit consisting of a pair of cup members, each of which comprises a body frame, a plurality of movable segments hung within the frame, and knife-carrying members carried by said segments, a manually controlled clamping ring embracing each cup member and adapted to engage the movable segments thereof to cause the cup member to act as a clamp for holding the object, and means for separately rotating the two cup members.

8. A paring machine including a paring unit consisting of a pair of superposed cup members each carrying knives, means for separately rotating the cup members, and an end cutter head arranged within the bottom part of each cup member and rotatable therewith.

9. A paring machine including a paring unit consisting of a pair of superposed cup members each carrying knives, means for separately rotating the cup members, and an end cutter head arranged within the cup member and rotatable therewith, each of said cutter heads having a holding element for the object and a plurality of radially extending terminal knife blades.

10. A paring machine including a paring unit consisting of a pair of superposed cup members each carrying knives, means for separately rotating the cup members, an end cutter head yieldingly mounted within one cup member, an ejecting cutter head movably mounted within the other cup member, and means for operating the latter cutter head to eject a pared object.

11. A paring machine including a paring unit consisting of a pair of superposed cup members each carrying knives, a vertically swinging top frame connected with the upper cup member for raising the same, means for separately rotating the cup members, an ejector movably mounted within one of the cup members, means actuated by the movement of said top frame for operating said ejector, and a discharging device also actuated by the movement of said top frame and arranged to discharge the object from the ejector.

12. A paring machine including a paring unit consisting of a pair of cup members each having cutting means, means for rotating the cup members, means for separating the cup members, an ejector arranged in one of the cup members and operatively connected with said separating means, and a discharging device automatically operated and released by said separating means, and including a plurality of swinging and sliding kicker bars adapted to work above said ejector.

13. A paring machine including a paring unit consisting of a pair of cup members each having cutting means, means for rotating the cup members, a vertically swinging top frame connected with the upper cup member for separating the cup members, a sliding ejector within one cup member, operating connections between said ejector and said top frame, and a discharging device comprising a plurality of swinging and sliding kicker bars working over the ejector, and a spring retracted trip lever operatively connected with said kicker bars and having a tripping engagement with said top frame.

14. A paring machine including a paring unit consisting of a pair of cup members, each having cutting means and movable clamp members, a yieldingly supported clamping ring engaging each cup member and adapted to engage said movable clamp members thereof, separate lever means for operating the clamping rings respectively for the separate cup members, and means for rotating the cup members.

15. A paring machine including a machine stand, a series of paring units arranged within the stand and each consisting of a pair of superposed cup members having holding and cutting means, a vertically swinging top frame connected with the upper cup members of all of the units, a delivery chute arranged at one side of the series of paring units, a slicing mechanism receiving the objects from said chute, driving mechanism including means for rotating the upper and lower series of cup members and for operating said slicing mechanism, and means for discharging the pared objects from the paring unit into said chute when the units are opened by the lifting of said top frame.

In testimony whereof I hereunto affix my signature in the presence of two witnesses.

TOBIAS MILLER.

Witnesses:
AGNES A. JOHNSTON,
F. E. CAILOR.